(12) United States Patent
Wengreen et al.

(10) Patent No.: US 10,289,922 B1
(45) Date of Patent: May 14, 2019

(54) SYSTEM FOR MANAGING LOST, MISLAID, OR ABANDONED PROPERTY IN A SELF-DRIVING VEHICLE

(71) Applicants: Eric John Wengreen, Sammamish, WA (US); Wesley Edward Schwie, Minneapolis, MN (US)

(72) Inventors: Eric John Wengreen, Sammamish, WA (US); Wesley Edward Schwie, Minneapolis, MN (US)

( * ) Notice: Subject to any disclaimer, the term of this patent is extended or adjusted under 35 U.S.C. 154(b) by 0 days.

(21) Appl. No.: 16/134,190

(22) Filed: Sep. 18, 2018

(51) Int. Cl.
*G06K 9/00* (2006.01)
*G01C 21/00* (2006.01)
*G01C 21/36* (2006.01)
*G05D 1/00* (2006.01)
*G05D 1/02* (2006.01)
*G06Q 50/30* (2012.01)
*G08G 1/00* (2006.01)

(52) U.S. Cl.
CPC ....... *G06K 9/00832* (2013.01); *G01C 21/362* (2013.01); *G05D 1/0022* (2013.01); *G05D 1/0088* (2013.01); *G06Q 50/30* (2013.01); *G08G 1/202* (2013.01); *G08G 1/205* (2013.01); *G05D 2201/0212* (2013.01); *G06K 9/00838* (2013.01)

(58) Field of Classification Search
CPC .. G06K 9/00832; G01C 21/362; G01G 1/202; G01G 1/205
See application file for complete search history.

(56) References Cited

U.S. PATENT DOCUMENTS

| | | | |
|---|---|---|---|
| 4,212,069 | A | 7/1980 | Baumann |
| 5,798,695 | A | 8/1998 | Metalis |
| 5,945,919 | A | 8/1999 | Trask |
| 6,011,478 | A | 1/2000 | Suzuki |
| 7,413,357 | B2 | 8/2008 | Badalian |
| 7,698,078 | B2 | 4/2010 | Kelty |
| 7,777,619 | B2 | 8/2010 | Yopp |
| 8,078,359 | B2 | 12/2011 | Small |
| 8,180,379 | B2 | 5/2012 | Forstall |
| 8,325,025 | B2 | 12/2012 | Morgan |
| 8,433,934 | B1 | 4/2013 | On |
| 8,634,980 | B1 | 1/2014 | Urmson |
| 8,700,251 | B1 | 4/2014 | Zhu |
| 8,849,494 | B1 | 9/2014 | Herbach |
| 8,874,305 | B2 | 10/2014 | Dolgov |
| 8,949,016 | B1 | 2/2015 | Ferguson |
| 8,954,217 | B1 | 2/2015 | Montemerlo |
| 8,954,252 | B1 | 2/2015 | Urmson |
| 8,965,621 | B1 | 2/2015 | Urmson |
| 8,996,224 | B1 | 3/2015 | Herbach |
| 9,008,890 | B1 | 4/2015 | Herbach |
| 9,019,107 | B2 | 4/2015 | Biondo |
| 9,026,300 | B2 | 5/2015 | Ferguson |

(Continued)

OTHER PUBLICATIONS

Google Self-Driving Vehicle—Online prior to Apr. 13, 2016 at www.google.com/selfdrivingcar/.

(Continued)

*Primary Examiner* — Todd M Melton

(57) ABSTRACT

A maintenance system can be used with a self-driving vehicle. The maintenance system can include a camera system coupled to an interior of the vehicle and a vehicle management system configured to autonomously drive the vehicle to a first location to remove an item left in the vehicle by a rider.

29 Claims, 8 Drawing Sheets

(56) References Cited

U.S. PATENT DOCUMENTS

| | | | |
|---|---|---|---|
| 9,119,038 B2 | 8/2015 | Woods | |
| 9,120,484 B1 | 9/2015 | Ferguson | |
| 9,120,485 B1 | 9/2015 | Dolgov | |
| 9,139,133 B2 | 9/2015 | Eng | |
| 9,194,168 B1 | 11/2015 | Lu | |
| 9,262,914 B2 | 2/2016 | Purushothaman | |
| 9,290,174 B1 | 3/2016 | Zagorski | |
| 9,429,947 B1 | 8/2016 | Wengreen | |
| 9,459,622 B2 | 10/2016 | Abhyanker | |
| 9,514,623 B1 | 12/2016 | Urrutia | |
| 9,527,217 B1 | 12/2016 | Lowy | |
| 9,646,356 B1 | 5/2017 | Schwie | |
| 9,685,058 B2 | 6/2017 | Schmidt | |
| 9,915,949 B2 | 3/2018 | Schwie | |
| 10,036,642 B2 | 7/2018 | Ross | |
| 10,050,760 B2 | 8/2018 | Ross | |
| 10,115,029 B1 * | 10/2018 | Day | G06K 9/00832 |
| 2002/0121291 A1 | 9/2002 | Daum | |
| 2003/0195696 A1 | 10/2003 | Jones | |
| 2007/0198144 A1 | 8/2007 | Norris | |
| 2008/0144944 A1 * | 6/2008 | Breed | G06K 9/00369 382/224 |
| 2009/0140886 A1 | 6/2009 | Bender | |
| 2009/0287367 A1 | 11/2009 | Salinger | |
| 2011/0098017 A1 | 4/2011 | Berry | |
| 2012/0009845 A1 | 1/2012 | Schmelzer | |
| 2012/0083960 A1 | 4/2012 | Zhu | |
| 2013/0085817 A1 | 4/2013 | Pinkus | |
| 2013/0132140 A1 | 5/2013 | Amin | |
| 2013/0197674 A1 | 8/2013 | Lowry | |
| 2013/0231824 A1 | 9/2013 | Wilson | |
| 2013/0246301 A1 | 9/2013 | Radhakrishnan | |
| 2014/0129951 A1 | 5/2014 | Amin | |
| 2014/0172727 A1 | 6/2014 | Abhyanker | |
| 2014/0316616 A1 | 10/2014 | Kugelmass | |
| 2014/0336935 A1 | 11/2014 | Zhu | |
| 2014/0350855 A1 | 11/2014 | Vishnuvajhala | |
| 2015/0012833 A1 | 1/2015 | Foy | |
| 2015/0046080 A1 | 2/2015 | Wesselius | |
| 2015/0066284 A1 | 3/2015 | Yopp | |
| 2015/0088421 A1 | 3/2015 | Foster | |
| 2015/0120504 A1 | 4/2015 | Todasco | |
| 2015/0148077 A1 | 5/2015 | Jelle | |
| 2015/0149283 A1 | 5/2015 | Horstemeyer | |
| 2015/0185034 A1 | 7/2015 | Abhyanker | |
| 2015/0199619 A1 | 7/2015 | Ichinose | |
| 2015/0248689 A1 | 9/2015 | Paul | |
| 2015/0271290 A1 | 9/2015 | Tao | |
| 2015/0295949 A1 | 10/2015 | Chizeck | |
| 2015/0339928 A1 | 11/2015 | Ramanujam | |
| 2015/0346727 A1 | 12/2015 | Ramanujam | |
| 2015/0348221 A1 | 12/2015 | Pedersen | |
| 2016/0027307 A1 | 1/2016 | Abhyanker | |
| 2016/0034828 A1 | 2/2016 | Sarawgi | |
| 2016/0034845 A1 | 2/2016 | Hiyama | |
| 2016/0071056 A1 | 3/2016 | Ellison | |
| 2016/0092976 A1 | 3/2016 | Marusyk | |
| 2016/0116293 A1 | 4/2016 | Grover | |
| 2016/0125735 A1 | 5/2016 | Tuukkanen | |
| 2016/0187150 A1 | 6/2016 | Sherman | |
| 2016/0209220 A1 | 7/2016 | Laetz | |
| 2016/0209843 A1 | 7/2016 | Meuleau | |
| 2016/0227193 A1 | 8/2016 | Osterwood | |
| 2016/0247095 A1 | 8/2016 | Scicluna | |
| 2016/0247106 A1 | 8/2016 | Dalloro | |
| 2016/0264021 A1 | 9/2016 | Gillett | |
| 2016/0277560 A1 | 9/2016 | Gruberman | |
| 2016/0301698 A1 | 10/2016 | Katara | |
| 2016/0342934 A1 | 11/2016 | Michalik | |
| 2016/0364812 A1 | 12/2016 | Cao | |
| 2016/0370194 A1 | 12/2016 | Colijn | |
| 2017/0024393 A1 | 1/2017 | Choksi | |
| 2017/0050321 A1 | 2/2017 | Look | |
| 2017/0068245 A1 | 3/2017 | Scofield | |
| 2017/0075358 A1 | 3/2017 | Zhang | |
| 2017/0089715 A1 | 3/2017 | Guo | |
| 2017/0098364 A1 * | 4/2017 | Jaegal | B60Q 9/00 |
| 2017/0103490 A1 | 4/2017 | Haparnas | |
| 2017/0132540 A1 | 5/2017 | Haparnas | |
| 2017/0147951 A1 | 5/2017 | Meyer | |
| 2017/0147959 A1 | 5/2017 | Sweeney | |
| 2017/0248949 A1 | 8/2017 | Moran | |
| 2017/0300053 A1 | 10/2017 | Wengreen | |
| 2017/0316621 A1 | 11/2017 | Jefferies | |
| 2017/0337437 A1 * | 11/2017 | Kanagaraj | G06K 9/00832 |
| 2017/0363430 A1 | 12/2017 | Al-Dahle | |
| 2018/0126960 A1 * | 5/2018 | Reibling | B60S 1/64 |
| 2018/0130161 A1 | 5/2018 | Wengreen | |
| 2018/0225749 A1 * | 8/2018 | Shoen | G06Q 30/0645 |
| 2018/0225890 A1 * | 8/2018 | Jales Costa | G07C 5/006 |

OTHER PUBLICATIONS

Testa Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.com/2016105'06/lyfl-self-driving-cars-2017/, pp. 1-5.
Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.
Explain That Stuff: Smoke Detectors—Downloaded on Sep. 28, 2018 from www.explainthatstuff.com/smokedetector.html.
Nittan: EV-DP Smoke Detector—Downloaded on Sep. 28, 2018 from nittan.co.uk/products/products/ev/ev-dp.
Wikipedia: Rain Sensor—Downloaded on Sep. 28, 2018 from en.wikipedia.org/wiki/Rain_sensor.
Nest: Split-Spectrum White Paper—Downloaded on Oct. 1, 2018 from nest.com/support/images/misc-assets/Split-Spectrum-Sensor-White-Paper.pdf.
How Police Visually Detect Drunk Drivers—Downloaded on Oct. 19, 2018 from thelaw.com/law/how-police-visually-detect-drunk-drivers.185.
Velodyne VLS-128 LiDAR Sensor—Downloaded on Oct. 22, 2018 from velodynelidar.com/vls-128.html.
Waymo's Suite of Custom-Built, Self-Driving Hardware—Downloaded on Oct. 22, 2018 from medium.com/waymo/introducing-waymos-suite-of-custom-built-self-driving-hardware-c47d1714563.
Lidar—Downloaded on Oct. 24, 2018 from en.wikipedia.org/wiki/Lidar.
Radar—Downloaded on Oct. 24, 2018 from en.wikipedia.org/wiki/Radar.

* cited by examiner

SYSTEM FOR MANAGING LOST, MISLAID, OR ABANDONED PROPERTY IN A SELF-DRIVING VEHICLE

CROSS-REFERENCE TO RELATED APPLICATIONS

The entire contents of the following application are incorporated by reference herein: U.S. patent application Ser. No. 16/128,334; filed Sep. 11, 2018; and entitled SELF-DRIVING VEHICLE SYSTEMS AND METHODS.

The entire contents of the following application are incorporated by reference herein: U.S. patent application Ser. No. 15/863,903; filed Jan. 8, 2018; and entitled SELF-DRIVING VEHICLE SYSTEMS AND METHODS.

The entire contents of the following application are incorporated by reference herein: U.S. patent application Ser. No. 16/049,275; filed Jul. 30, 2018; and entitled SELF-DRIVING VEHICLE SYSTEMS AND METHODS.

The entire contents of the following application are incorporated by reference herein: U.S. patent application Ser. No. 15/181,413; filed Jun. 14, 2016; and entitled SELF-DRIVING VEHICLE SYSTEMS AND METHODS.

The entire contents of the following application are incorporated by reference herein: U.S. patent application Ser. No. 15/099,565; filed Apr. 14, 2016; and entitled SELF-DRIVING VEHICLE SYSTEMS AND METHODS.

The entire contents of the following application are incorporated by reference herein: U.S. patent application Ser. No. 15/248,910; filed Aug. 26, 2016; and entitled SELF-DRIVING VEHICLE SYSTEMS AND METHODS.

The entire contents of the following application are incorporated by reference herein: U.S. patent application Ser. No. 15/589,619; filed May 8, 2017; and entitled SELF-DRIVING VEHICLE SYSTEMS AND METHODS.

BACKGROUND

Field

Various embodiments disclosed herein relate to vehicles. Certain embodiments relate to self-driving vehicles.

Description of Related Art

Vehicles typically require a driver. These vehicles often can only perform actions when directly steered by the driver. However, self-driving vehicles are not reliant upon drivers and can perform actions based upon particular events. Self-driving vehicles can dramatically increase travel safety and convenience. As a result, there is a need for systems and methods that enable self-driving vehicles to perform actions based upon particular events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Some embodiments enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

Some embodiments comprise a maintenance system configured to be used with a self-driving vehicle. In some embodiments, maintenance systems comprise a camera system coupled to an interior of the vehicle. The camera system can be configured to take a picture of an item left behind by a first rider. Maintenance system can comprise a vehicle management system configured to autonomously drive the vehicle to a first location to remove the item.

In some embodiments, the camera system comprises a first camera coupled to a ceiling of the vehicle and directed towards a first row of the vehicle, and the camera system comprises a second camera coupled to the ceiling of the vehicle and directed towards a second row of the vehicle.

In some embodiments, the camera system comprises a first camera coupled to a rear-view mirror of the vehicle and directed towards a first row of the vehicle, and the camera system comprises a second camera coupled to a ceiling of the vehicle and directed towards a second row of the vehicle.

In some embodiments, the camera system comprises a first camera located in a trunk area of the vehicle such that the first camera is configured to enable an image analysis system to determine if the item is left in the trunk area.

In some embodiments, the maintenance system comprises an image analysis system configured to detect the item left behind by comparing a first baseline image taken by the camera system of the interior of the vehicle to a second image taken by the camera system after the first baseline image.

In some embodiments, the vehicle management system is configured to automatically drive the vehicle to the first location to remove the item in response to the image analysis system detecting the item left by the first rider.

Some embodiments comprise a communication system configured to send a first wireless communication to a remote computing device associated with the first rider in response to the image analysis system detecting the item left behind by the first rider. The first wireless communication can be configured to notify the first rider that the item was left behind.

In some embodiments, the communication system is configured to send a second wireless communication comprising a third image of the item to the remote computing device in response to the image analysis system detecting the item left behind by the first rider. The third image can enable the rider to see the item on a display of her remote computing device.

In some embodiments, the vehicle management system is configured to receive an address of the first location from the remote computing device in response to the communication system sending the first wireless communication.

In some embodiments, the first location is an address at which the first rider has requested to pick up the item. The address can be the rider's current address. The address can also be a location at which the rider is not currently located by at which the rider (or the rider's representative) plans to meet the vehicle (or another vehicle carrying the item) to retrieve the item.

In some embodiments, the communication system is configured to receive a third wireless communication from the remote computing device associated with the first rider in response to the communication system sending the first wireless communication. The third wireless communication can comprise instructions for shipping the item.

In some embodiments, the first location is a shipping location (such as a FedEx, UPS, or USPS facility) configured to remove the item from the vehicle and configured to ship the item according to the shipping instructions. The vehicle management system can be configured to enable removing the item from the vehicle once the vehicle is located at the shipping location.

In some embodiments, the vehicle management system is configured to receive the first location of a service area configured to clean the vehicle. The vehicle management system can be configured to drive the vehicle to the service area to remove the item in response to the image analysis system detecting the item left by the first rider.

Some embodiments comprise a third image taken by the camera system in response to the vehicle leaving the service area. Some embodiments comprise a communication system configured to send a first wireless communication comprising the third image to a remote computing device associated with a manager of the vehicle. The first wireless communication can be configured to enable the manager to verify that the item was removed from the vehicle.

Some embodiments comprise a third image taken by the camera system. The image analysis system can be configured to compare the third image to the second image to detect that the item was removed from the vehicle.

In some embodiments, the vehicle management system is configured to fine an account of the first rider in response to the image analysis system detecting the item left behind by the first rider.

In some embodiments, a communication system is configured to send a first wireless communication to a remote computing device associated with the first rider in response to the image analysis system detecting the item left behind by the first rider. The first wireless communication can comprise a third image taken by the camera system. The third image can be configured to show the item. The first wireless communication can be configured to ask the first rider if the item belongs to the first rider. The communication system can be configured to receive a second wireless communication from the remote computing device in response to the first wireless communication. The second wireless communication can be configured to inform the maintenance system that the first rider is an owner of the item. The maintenance system can comprise a memory configured to record that the first rider is the owner of the item.

In some embodiments, the maintenance system comprises a location detection system configured to receive the first location of a remote computing device associated with the first rider to enable the vehicle management system to autonomously drive the vehicle to the first location in response to an image analysis system detecting the item left by the first rider.

In some embodiments, the maintenance system comprises an image analysis system configured to detect the item left behind by comparing a first baseline image taken by the camera system of the interior of the vehicle to a second image (of the interior) taken by the camera system after the first baseline image.

In some embodiments, the maintenance system comprises a communication system having an antenna, a transmitter, and a receiver. The communication system can be configured to send a first wireless communication to a remote computing device associated with a manager of the vehicle in response to the image analysis system detecting the item left behind by the first rider.

In some embodiments, the first wireless communication is configured to notify the manager that the item was left behind. The communication system can be configured to send a second wireless communication comprising a third image of the item to the remote computing device in response to the image analysis system detecting the item left behind by the first rider.

In some embodiments, the vehicle management system is configured to receive a third wireless communication from the remote computing device in response to the communication system sending the first wireless communication. The third second wireless communication can be configured to instruct the vehicle management system to autonomously drive the vehicle to the first location to remove the item.

In some embodiments, the vehicle management system is configured to determine that the first rider has exited the vehicle. The vehicle management system can be configured to cause the camera system to take a first interior image of the interior of the vehicle in response to determining that the first rider has exited the vehicle.

In some embodiments, the maintenance system further comprises an image analysis system having at least one processor and a memory comprising program instructions (e.g., code modules configured to be executed by one or more computers) that when executed by the at least one processor are configured to cause the image analysis system to detect the item left behind by analyzing the first interior image taken by the camera system after the first rider has exited the vehicle. The first location can be a vehicle cleaning facility. The vehicle management system can be configured to drive the vehicle to the vehicle cleaning facility to remove the item in response to the image analysis system detecting the item.

In some embodiments, the vehicle management system comprises a first mode and a second mode. In the first mode, the vehicle management system can be configured to make the vehicle available to accept a pick-up request of a second rider. In the second mode, the vehicle management system can be configured to make the vehicle unavailable to accept the pick-up request. The vehicle management system can be configured to be in the second mode from a first time at which the image analysis system detects the item left behind. The vehicle management system can be configured to exit the second mode and enter the first mode in response to at least one of the item being removed, receiving an indication that the vehicle has been cleaned, and the vehicle leaving a vehicle cleaning station.

In some embodiments, the vehicle management system is configured to determine that the first rider has exited the vehicle in response to (1) receiving a location of a remote computing device associated with the first rider and determining that the location is not inside the vehicle, (2) failing to detect a direct wireless communication from the remote computing device to an antenna of the vehicle, (3) determining, by the image analysis system, that a second interior image does not show the first rider, and/or (4) determining, by the image analysis system, that an infrared image of the interior of the vehicle does not show the first rider.

In some embodiments, the maintenance system comprises at least one processor and a memory comprising program instructions that when executed by the at least one processor cause the maintenance system to (1) compare a first baseline image taken by the camera system of the interior of the vehicle to a second image taken by the camera system after the first baseline image to detect the item left behind by the first rider, and/or (2) drive, by the vehicle management system, the vehicle to the first location to remove the item in response to the detecting the item. The program instructions can comprise code modules configured to be executed by one or more computers located in the vehicle and/or located away from the vehicle.

In some embodiments, the first location is a first vehicle cleaning facility. The program instructions can be configured to select the first vehicle cleaning facility based at least in part on determining a distance from the vehicle to the first vehicle cleaning facility and/or based at least in part on determining that the first vehicle cleaning facility is approved by a manager of the vehicle. The memory can comprise a list vehicle cleaning facilities that were approved by the manager of the vehicle. The program instructions can be configured to choose a cleaning facility that was previously approved by the manager and is located near the current location of the vehicle.

In some embodiments, the program instructions are configured to send a first wireless communication to a remote computing device associated with the first rider in response to detecting the item. The first wireless communication can comprise an image of the item. The program instructions can be configured to receive a second wireless communication from the remote computing device in response to sending the first wireless communication. The second wireless communication can comprise an instruction (e.g., from the first rider) to return the item. The program instructions can be configured to drive, by the vehicle management system, the vehicle to the first location in response to the instruction.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
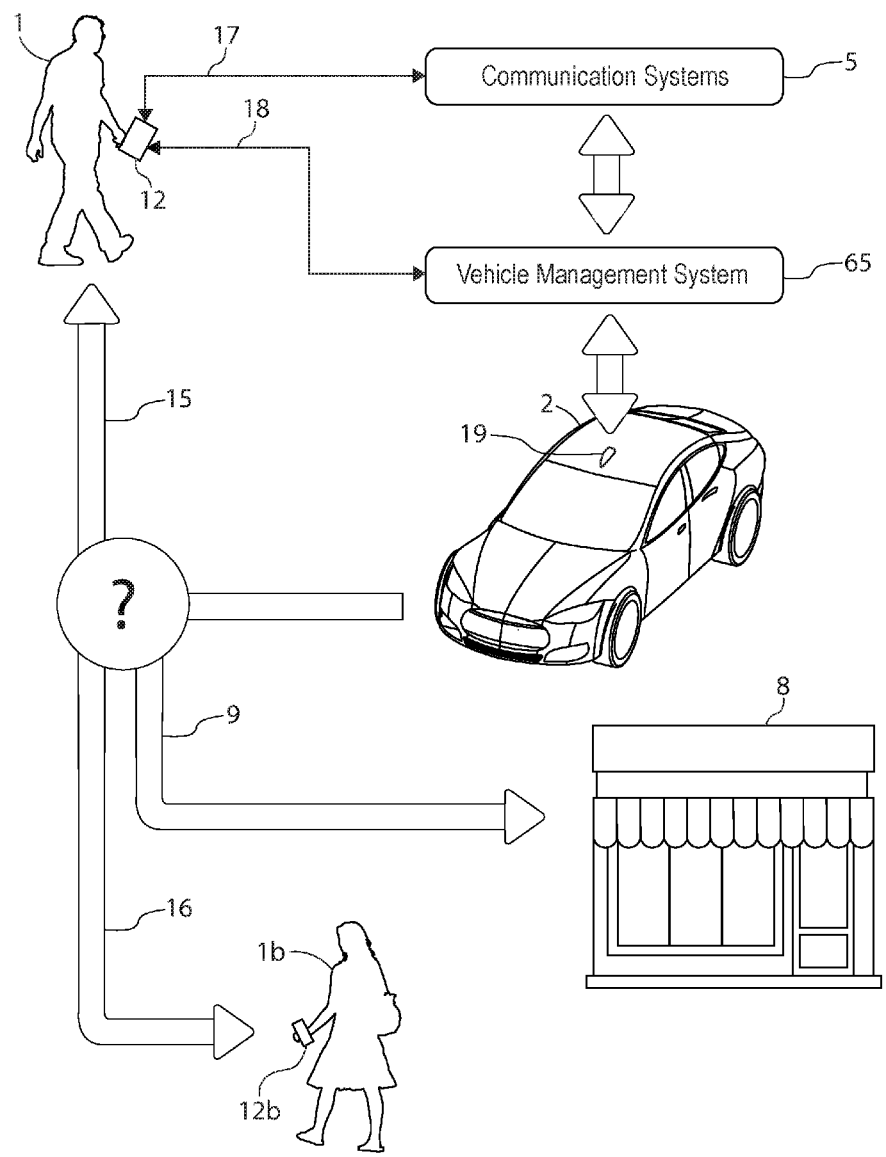
FIG. 1 illustrates a diagrammatic view that includes a self-driving vehicle configured to use a camera system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving cars are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Referring now primarily to FIG. 1, a vehicle management system 65 can be configured to govern the destinations of a self-driving vehicle 2. A first rider 1 can have a remote computing device 12 running software configured to enable the first rider 1 to request a ride from a ride service and/or from a particular vehicle.

The first rider 1 can open an "app" on an iPhone. The "app" can allow the first rider 1 to request a pick-up time and pick-up location.

The vehicle management system 65 can communicate with the remote computing device 12 of the first rider 1 directly (e.g., via radio communications such as Bluetooth) or indirectly via intermediary communication systems 5. Arrows 17, 18 indicate communication. (Many additional communication means and methods are compatible with the embodiments described herein.) An antenna 19 of the self-driving vehicle 2 can enable the vehicle management system 65 to communicate with remote computing devices 12, 12b.

A second rider 1b may request a ride via a second remote computing device 12b. In some cases, the vehicle management system 65 must choose between providing a ride to a first rider 1, providing a ride to a second rider 1b, and/or going to a first location 8 (e.g., to clean the vehicle prior to providing a ride to the first rider 1 and/or to the second rider 1b). Arrow 15 indicates the self-driving vehicle 2 driving to the first rider 1 to give the first rider 1 a ride. Arrow 9 indicates the self-driving vehicle 2 driving to the first location 8 instead of driving to pick up the second rider 1b right after dropping off the first rider 1. Arrow 16 indicates the self-driving vehicle 2 eventually picking up the second rider 1b (e.g., after the self-driving vehicle 2 is cleaned).

A person who owns a car is incentivized to keep the car clean because any mess the person leave in the car will be an annoyance to the person in the future. In contrast, a rider (who does not own the car) can leave a mess in the car without having to see the mess in the future. As a result, people who own self-driving vehicles 2 are motivated to keep the self-driving vehicles 2 clean while non-owning riders are more prone to leaving messes in self-driving vehicles 2. Owners of vehicles 2 will not want to make their self-driving vehicles 2 available for riders 1, 1b if the owners are concerned that their vehicles 2 will return messy (after providing the rides). Thus, there is a need for systems that help maintain self-driving vehicles 2.

An owner of a self-driving vehicle 2 will be reluctant to allow other riders to use the self-driving vehicle 2 (e.g., while the owner is at home or work) if the self-driving vehicle 2 will return messy. In addition, if a first rider 1 leaves a mess in the self-driving vehicle 2 (that is not cleaned up), subsequent riders will be unsatisfied with having to ride in a messy self-driving vehicle 2.

One option is to clean the self-driving vehicle 2 between each rider. This option, however, is often cost-prohibitive. Unlike rental cars that are often rented for a day or more at a time, self-driving vehicles 2 can be rented for just a few minutes at a time. Driving the self-driving vehicle 2 to a cleaning station after each few minutes of rental time would require far too many unnecessary cleanings and unnecessary miles driven. Some embodiments described herein enable cleaning the self-driving vehicle 2 only when necessary and otherwise permitting the self-driving vehicle 2 to be used by a series of riders without taking the time to clean the self-driving vehicle 2.

The self-driving vehicle 2 can include two modes. In the first mode, the self-driving vehicle 2 is considered clean and is available to accept a pick-up request. If the maintenance system detects that the self-driving vehicle 2 is unclean inside, then the system can enter a second mode in which the self-driving vehicle 2 is unavailable to accept a pick-up request and instead heads towards a cleaning facility. Once the self-driving vehicle 2 is clean, the system can enter the first mode again. As a result, the self-driving vehicle 2 may drop off the first rider 1, detect that the self-driving vehicle 2 has an item left behind by the first rider 1, and then instead of going to pick up the second rider 1b, can go to a cleaning facility. (Another self-driving vehicle can pick up the second rider 1b or the second rider 1b can wait for the self-driving vehicle 2 to be cleaned and then can receive a ride from the self-driving vehicle 2.)

The vehicle management system 65 can be a portion of the self-driving vehicle 2. Communication between the vehicle 2 and the vehicle management system 65 can occur via electrical wires that couple the vehicle management system 65 to other portions of the vehicle 2.

In some embodiments, the vehicle management system 65 is located remotely relative to the self-driving vehicle 2. Communication between the vehicle 2 and the vehicle management system 65 can occur via wireless communications that travel over intermediary communication systems 5.

In some embodiments, intermediary communication systems 5 are used to perform each step. Intermediary communication systems 5 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The communicative coupling between the remote computing device 12 and the vehicle management system 65 can be via intermediary communication systems 5. In other words, intermediary communication systems 5 can communicatively couple the remote computing device 12 and the vehicle management system 65. This communicative coupling may be via intermittent wireless communications. For example, the vehicle management system 65 may send a wireless message to the remote computing device 12 periodically (e.g., every 10 seconds, every 60 seconds, every 10 minutes). As used herein, "periodically" does not imply that every period has the same duration. In some embodiments, the communicative coupling between the self-driving vehicle 2 and the vehicle management system 65 is via intermediary communication systems 5.

Some embodiments include methods of using the vehicle management system 65 to operate the self-driving vehicle 2. The vehicle management system 65 is configured to be communicatively coupled with a remote computing device 12, which is configured to operate software, such as an iPhone application or an Android application adapted to enable a user to control behaviors of the self-driving vehicle 2. Behaviors can include actions and non-actions of the self-driving vehicle 2, such as picking up the user at a location, picking up the user at a time based on a schedule of the user or a time based on past pick-up times, remaining idle, driving to a residence of the user, pulling out of a garage, parking the vehicle, getting gas, charging the vehicle, and the like.

Figure 2:
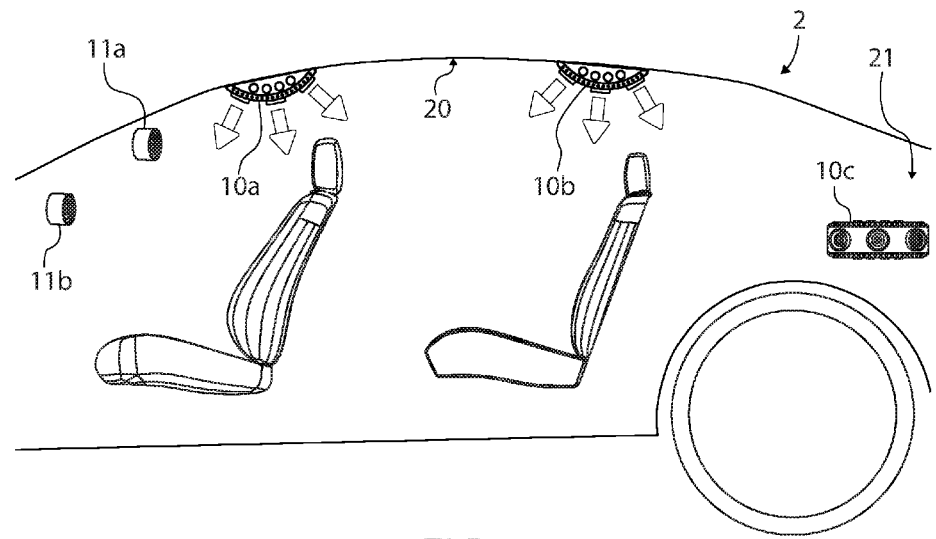
FIG. 2 illustrates a side view of an interior of the self-driving vehicle with cameras located in several areas, according to some embodiments.

Referring now primarily to FIG. 2, the maintenance system can comprise a camera system having one or more camera devices 10a, 10b, 10c, 10d, 11a, 11b. The camera devices 10a, 10b, 10c, 10d, 11a, 11b can include any of the features and capabilities described in the context of the camera device 10.

Camera devices 10a, 10b can be coupled to a ceiling 20 of the self-driving vehicle 2 such that they include cameras directed towards the first row of seats and/or towards the second row of seats. Camera devices 10c can be placed in a trunk area of the self-driving vehicle 2 (e.g., to enable taking pictures and/or videos of items left in the trunk area).

A camera device 11a can be integrated into the rear-view mirror of the self-driving vehicle 2. A camera device 11b can be integrated into the dash of the self-driving vehicle 2. Camera devices 10a, 10b, 10c, 11a, 11b can be placed in any area of the self-driving vehicle 2.

Figure 3:
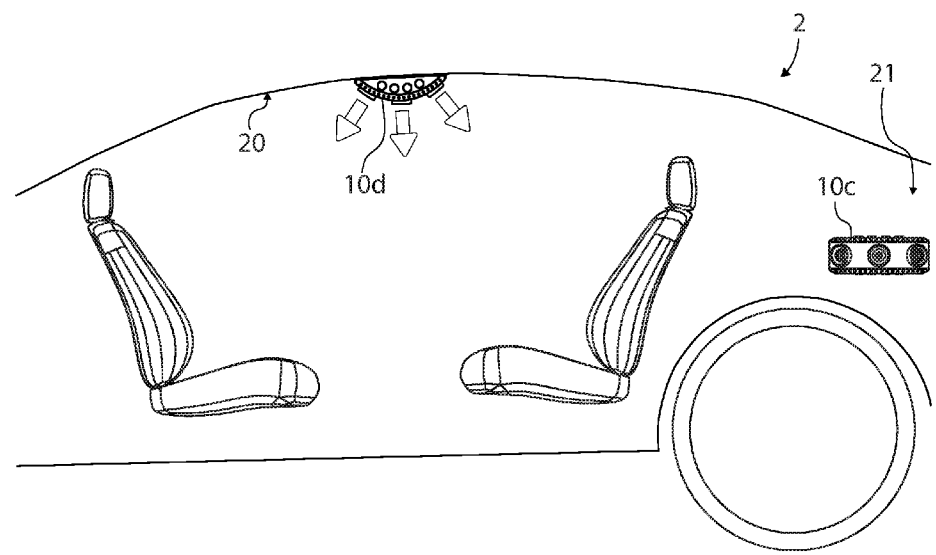
FIG. 3 illustrates a side view of an interior of the self-driving vehicle with seats facing each other, according to some embodiments.

As illustrated in FIG. 3, the first and second rows of seats can face towards each other to create a more social riding experience. A camera device 10d can be coupled to an interior of the self-driving vehicle 2. As illustrated in FIG. 3, the camera device 10d is coupled to the ceiling 20 of the self-driving vehicle 2.

Figure 4:
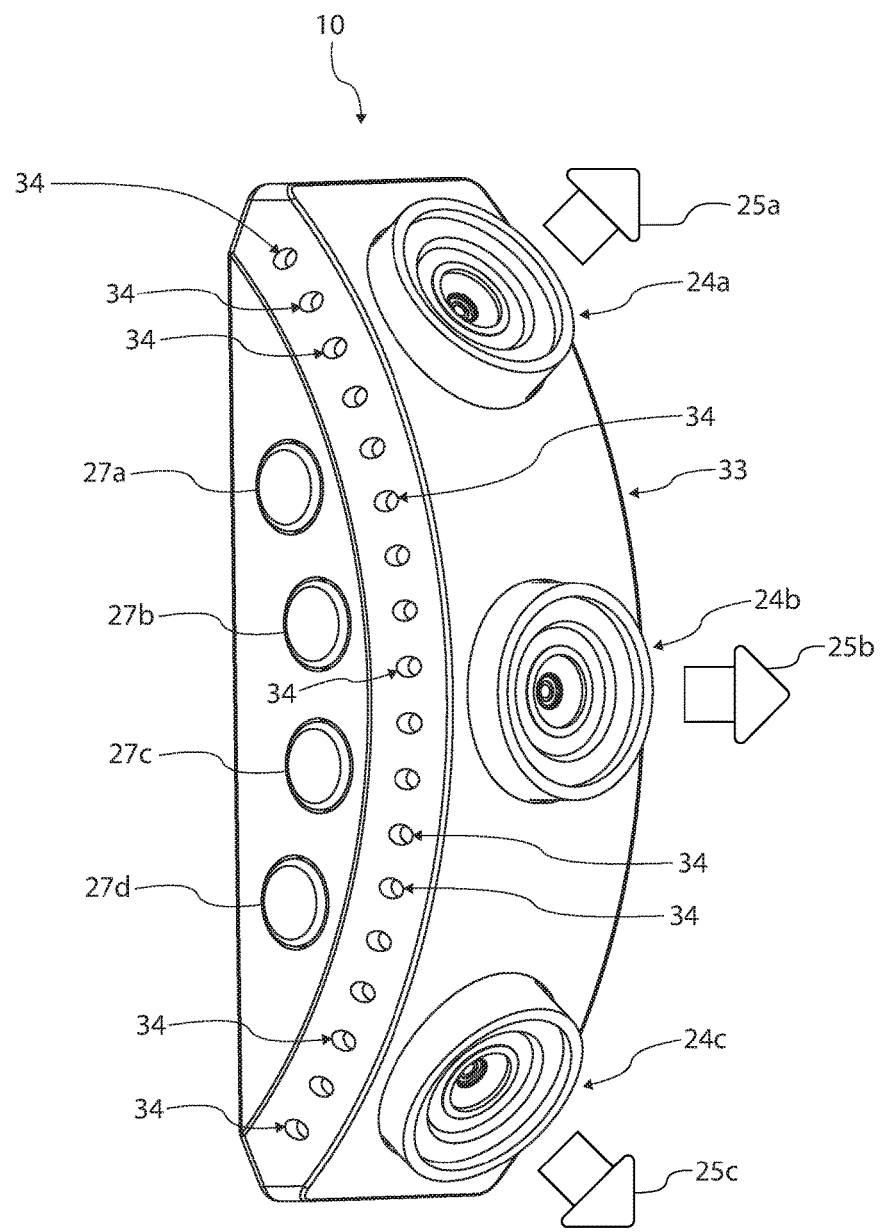
FIG. 4 illustrates a perspective view of a camera device, according to some embodiments.
Figure 5:
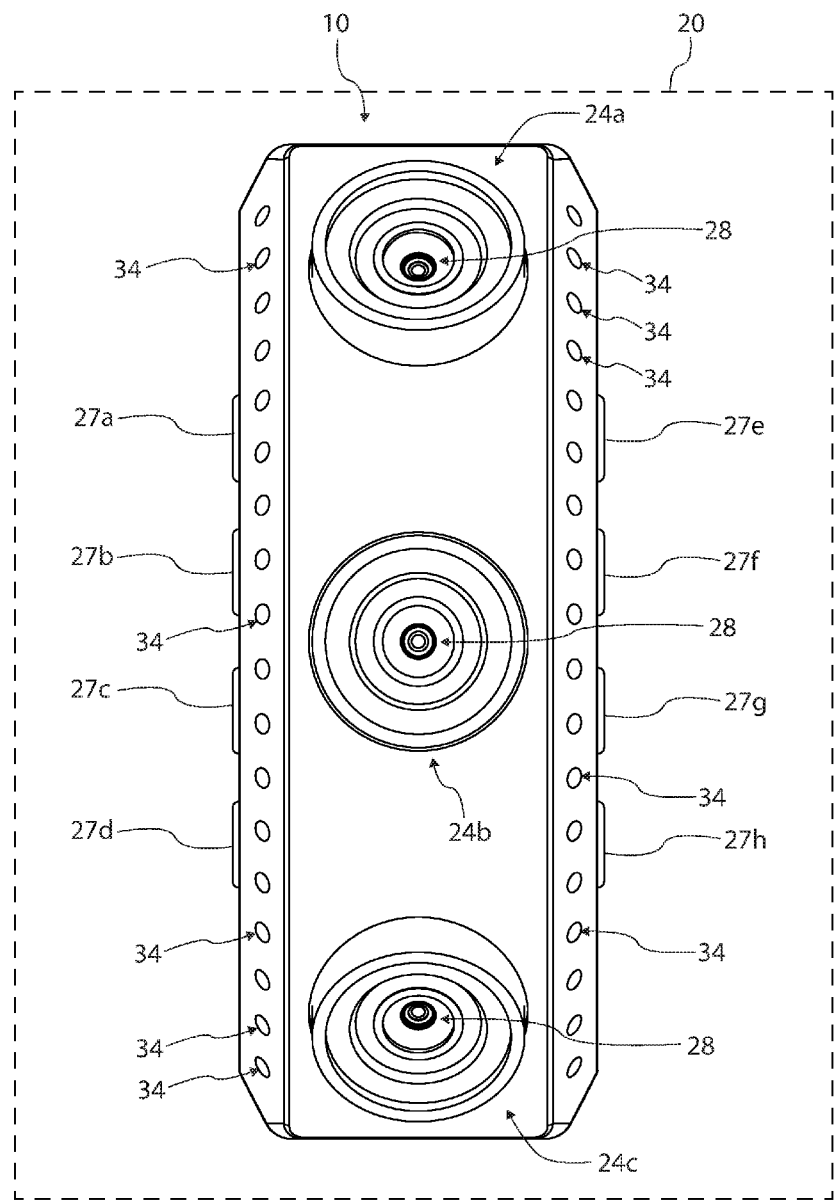
FIG. 5 illustrates a bottom view of the camera device, according to some embodiments.
Figure 6:
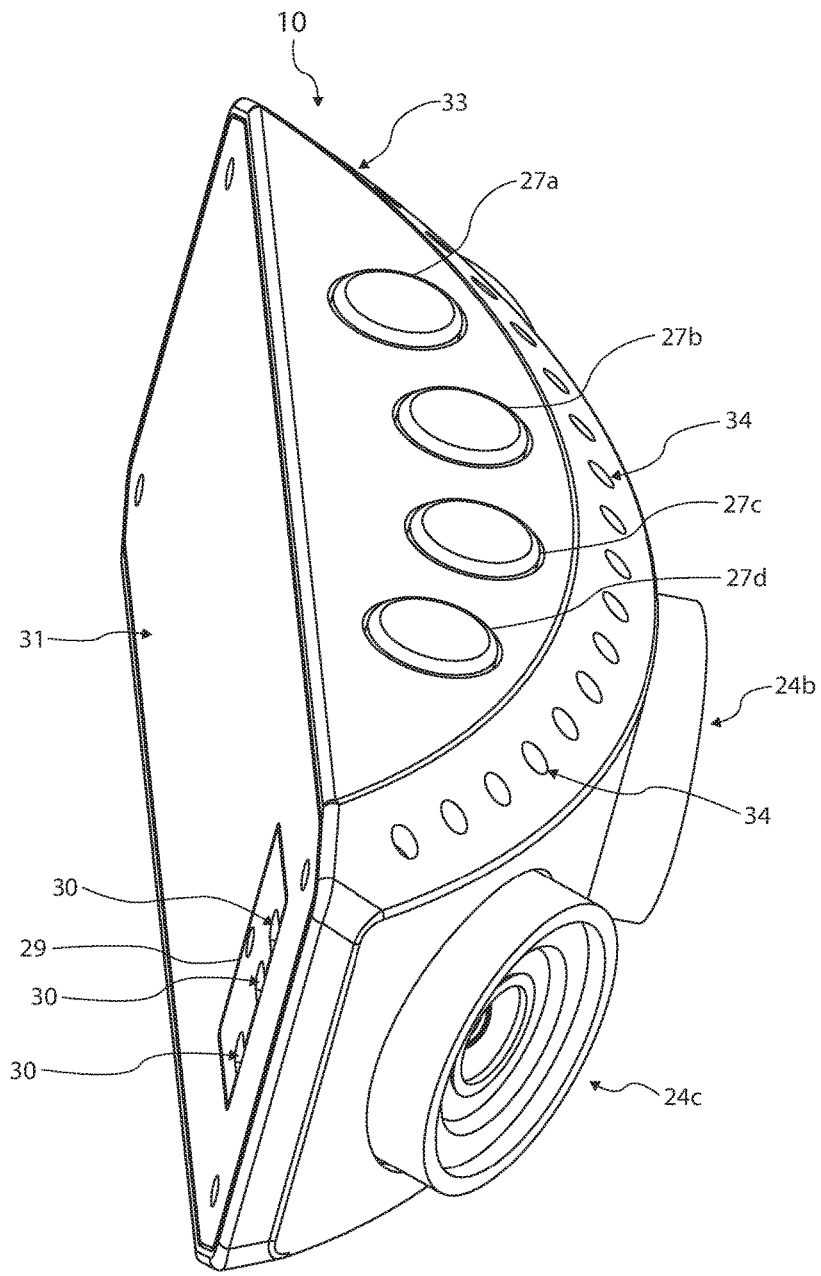
FIG. 6 illustrates a perspective view of the camera device, according to some embodiments.

FIG. 4 illustrates a perspective view of a camera device. FIG. 5 illustrates a bottom view of the camera device 10 coupled to a ceiling 20 of the self-driving vehicle 2. FIG. 6 illustrates a perspective view of the camera device 10 with the ceiling 20 hidden to show a top side of the camera device 10. (The top side is configured to face towards the ceiling 20 of the self-driving vehicle 2.)

The camera device 10 can include multiple cameras 24a, 24b, 24c. A first camera 24a can be directed in a first direction 25a (e.g., towards a front row of seats in the self-driving vehicle 2). A second camera 24b can be directed in a second direction 25b (e.g., towards a middle row of seats in the self-driving vehicle 2). A third camera 24c can be directed in a third direction 25c (e.g., towards a third row of seats in the self-driving vehicle 2).

Each camera 24a, 24b, 24c can include a wide-angle lens 28 to provide a wider field of view, which can be particularly helpful in the small confines of the self-driving vehicle 2. The cameras 24a, 24b, 24c can be high-resolution cameras with auto-focus.

The camera device 10 can comprise a rider detection system, a communication module (with can include an antenna, a transmitter, and a receiver), a printed circuit board populated with integrated circuits and other electrical components, an image analysis system, a battery, a power management system, a microphone, a speaker, a memory with software configured to carry out the features described herein, and lights configured to illuminate the interior of the self-driving vehicle 2.

The camera device 10 can comprise a smoke detector configured to detect if a rider is smoking (e.g., cigarettes, vaping) inside the self-driving vehicle 2. Holes 34 enable the smoke to enter the camera device 10 to enable the smoke detector to detect the smoke. Not all the holes 34 are labeled to increase the clarity of other features.

The camera device 10 includes buttons that can be configured to enable the rider to interact physically with the camera device. A first button 27a is configured to summon emergency responders in response to the rider pressing the button 27a. The camera device 10 can call "911" and can provide the GPS location of the self-driving vehicle 2 to the emergency responders.

A second button 27b is configured to call a virtual assistant (or a live human assistant) in response to the rider pressing the button 27b. The assistant can be configured to answer the rider's questions. The virtual assistant can use Apple's "Siri" technology or Amazon's "Alexa" technology.

Pressing a third button 27c can notify the maintenance system that the interior of the self-driving vehicle 2 needs to be cleaned. Pressing a fourth button 27d can notify the maintenance system that the exterior of the self-driving vehicle 2 needs to be cleaned.

The camera device 10 can include an outer housing 33 (e.g., molded from plastic) that snaps onto a molded plastic base plate 31 that is coupled to the ceiling 20 by screws. A hatch 29 can be removed to enable plugging cables into the camera device 10. The cables can provide electrical power from the self-driving vehicle 2 to the camera device 10. The cables can also communicatively couple the camera device 10 to other portions of the self-driving vehicle 2 that communicatively couple the self-driving vehicle 2 to the vehicle management system 65. The cables can exit through holes 30 in the hatch 29. The camera device 10 can be coupled by wires or wirelessly communicatively coupled to the other elements described herein and/or incorporated by reference.

The vehicle management system 65 can be wirelessly communicatively coupled to the self-driving vehicle 2 via intermediary communication systems 5. The remote computing device 12 can be wirelessly communicatively coupled to the vehicle management system 65 via intermediary communication systems 5. Intermediary communication systems 5 can comprise wireless networks, cellular networks, telephone networks, Internet systems, servers, cloud computing, remotely located computers, radio communication systems, satellite systems, communication systems, and any other suitable means of enabling wired and/or wireless communication between the remote computing device 12, the vehicle management system 65, and/or the self-driving vehicle 2.

In embodiments that include elements such as sending information or otherwise communicating, the remote computing device 12, the vehicle management system 65, and the self-driving vehicle 2 can do these elements by using intermediary communication systems 5. For example, the remote computing device 12, the vehicle management system 65, and the self-driving vehicle 2 may send wireless communications and/or receive wireless communications via intermediary communication systems 5, which can serve as a communication bridge between the remote computing device 12, the vehicle management system 65, and the self-driving vehicle 2.

Figure 7:
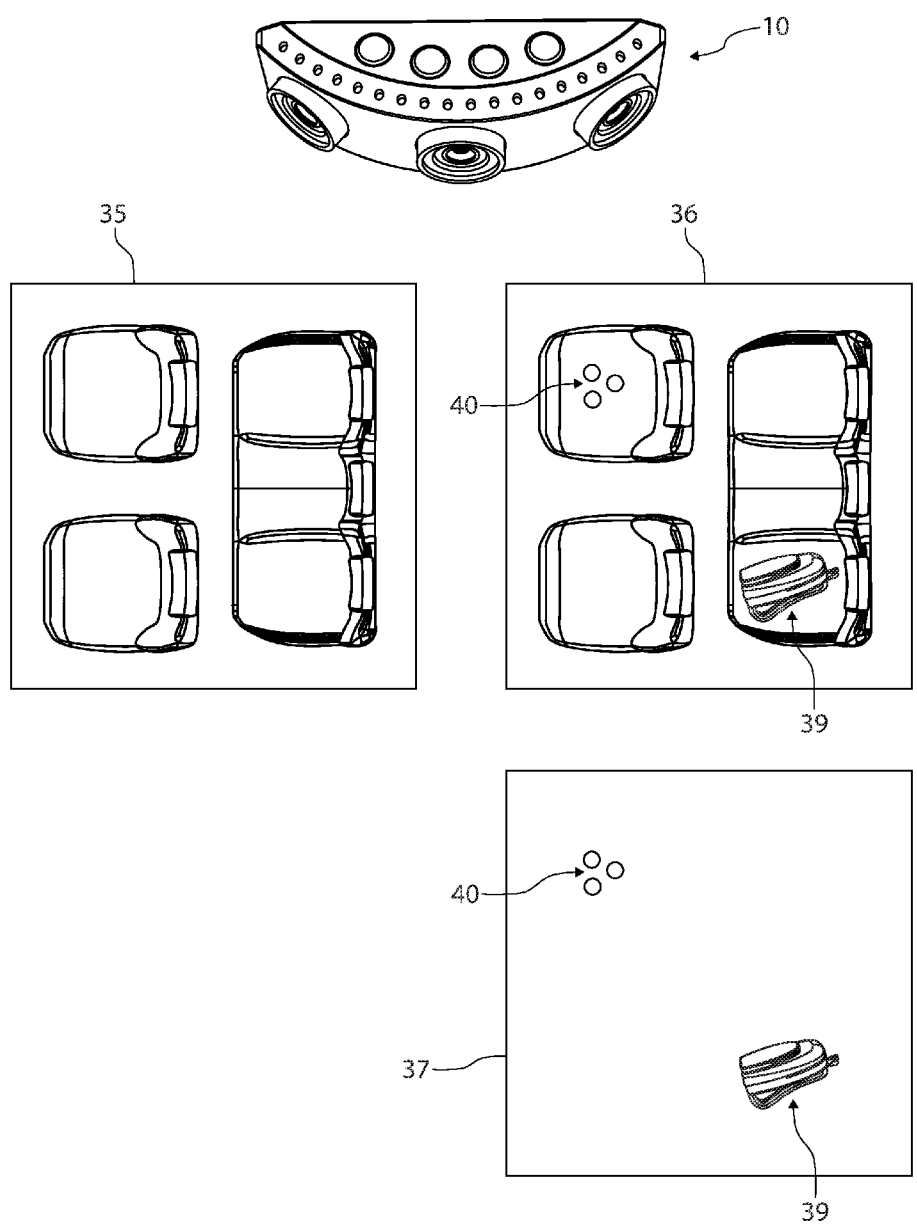
FIGS. 7 and 8 illustrate diagrammatic views regarding a camera system of a self-driving vehicle, according to some embodiments.

FIG. 7 illustrates a diagrammatic view of the camera device 10 and various images. The camera device 10 can take a first baseline image 35 (e.g., prior to the first rider 1 entering the self-driving vehicle 2). The camera device 10 can take a second image 36 in response to the first rider 1 exiting the self-driving vehicle 2. An image analysis system 70 can subtract the first baseline image 35 from the second image 36 to determine what features are in the second 36 but not in the first baseline image 35.

As shown in the subtraction result image 37, the first rider 1 left a valuable item 39 behind in the self-driving vehicle 2 and also left trash 40 behind in the self-driving vehicle 2. The system can send a picture of the valuable item 39 (e.g., a backpack or purse) to the first rider 1 to determine if the first rider 1 wants the system to return the valuable item 39 to the first rider 1. The system can remove the valuable item 39 prior to picking up a second rider 1b (to prevent the second rider from stealing the valuable item 39. In some embodiments, the system places the valuable item 39 in the trunk (and locks the trunk) prior to picking up the second rider 1b.

The system can determine the self-driving vehicle 2 needs to be cleaned prior to picking up the second rider 1b in response to detecting the trash 40.

Some embodiments use machine vision to detect the items 39, 40 left behind by analyzing the second image 36 without analyzing or needing the first baseline image 35. For example, software can be configured to detect that a backpack has been left in the self-driving vehicle 2 even if no baseline image 35 is available. In some cases, the first baseline image 35 can increase the accuracy and reliability of the system (e.g., by reducing false positives and false negatives).

Machine vision can recognize that shapes or even colors are indicative of an item not being part of the vehicle 2 (and thus the item is likely something left behind by a rider). Machine vision can recognize common shapes (e.g., a backpack, a purse, a laptop, a coffee mug, a fast-food bag, a person, a dog).

Figure 8:
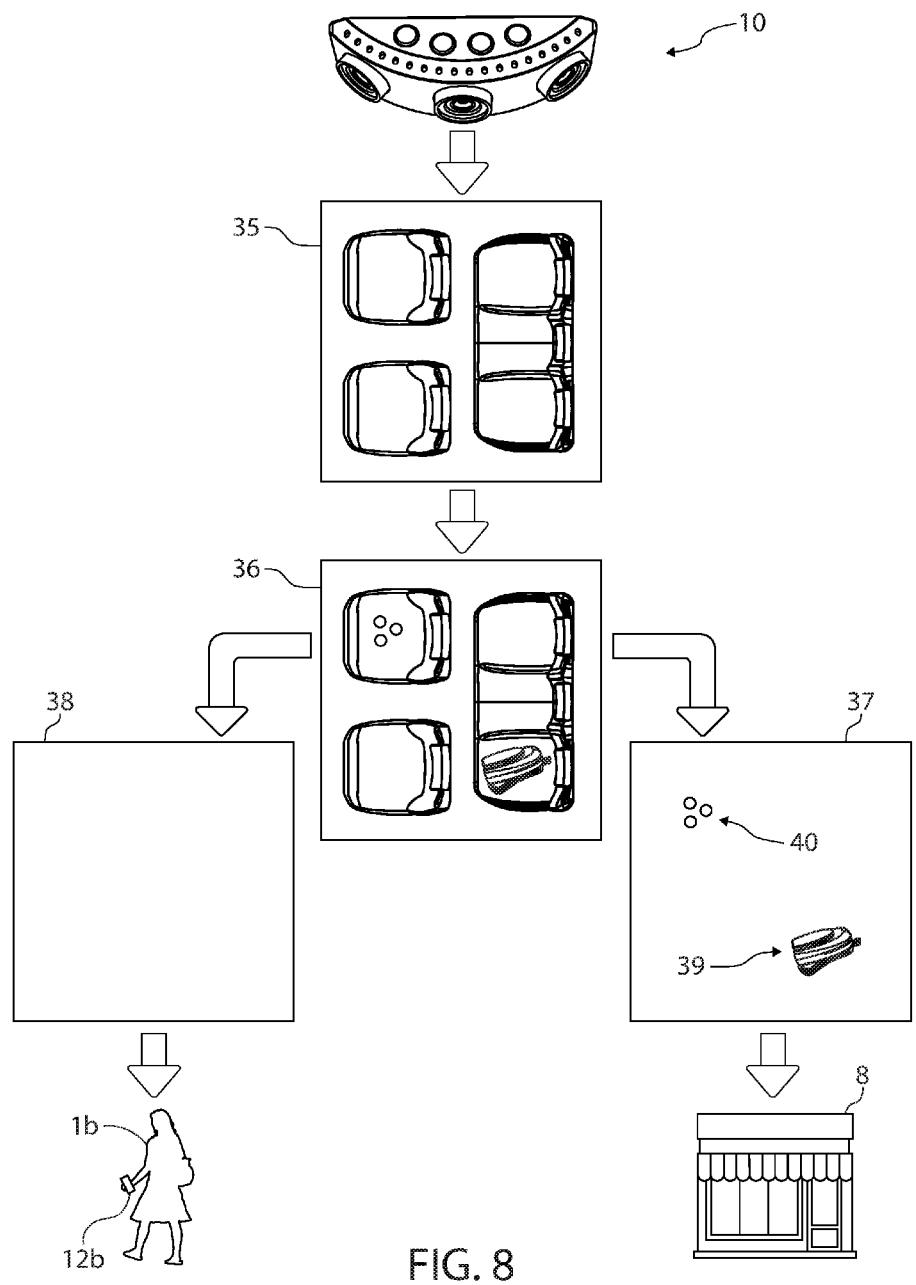

FIG. 8 illustrates a diagrammatic view of the system deciding to pick up a second rider 1b or deciding to go to a first location 8 (e.g., to remove an item left behind by a first rider 1). The system can detect items 39, 40 left behind by analyzing the second image 36 to detect things that should not be in the self-driving vehicle 2 after a rider 1 has left the self-driving vehicle 2.

The system can detect items 39, 40 left behind by comparing the second image 36 to a baseline image 35 (of items that should be located in the vehicle 2). If the system detects items 39, 40 (e.g., as illustrated in image 37), then the system can send the self-driving vehicle 2 to the first location 8. If the system does not detect any items left behind (e.g., as illustrated in image 38), then the system can pick up the second rider 1b.

Figure 9:
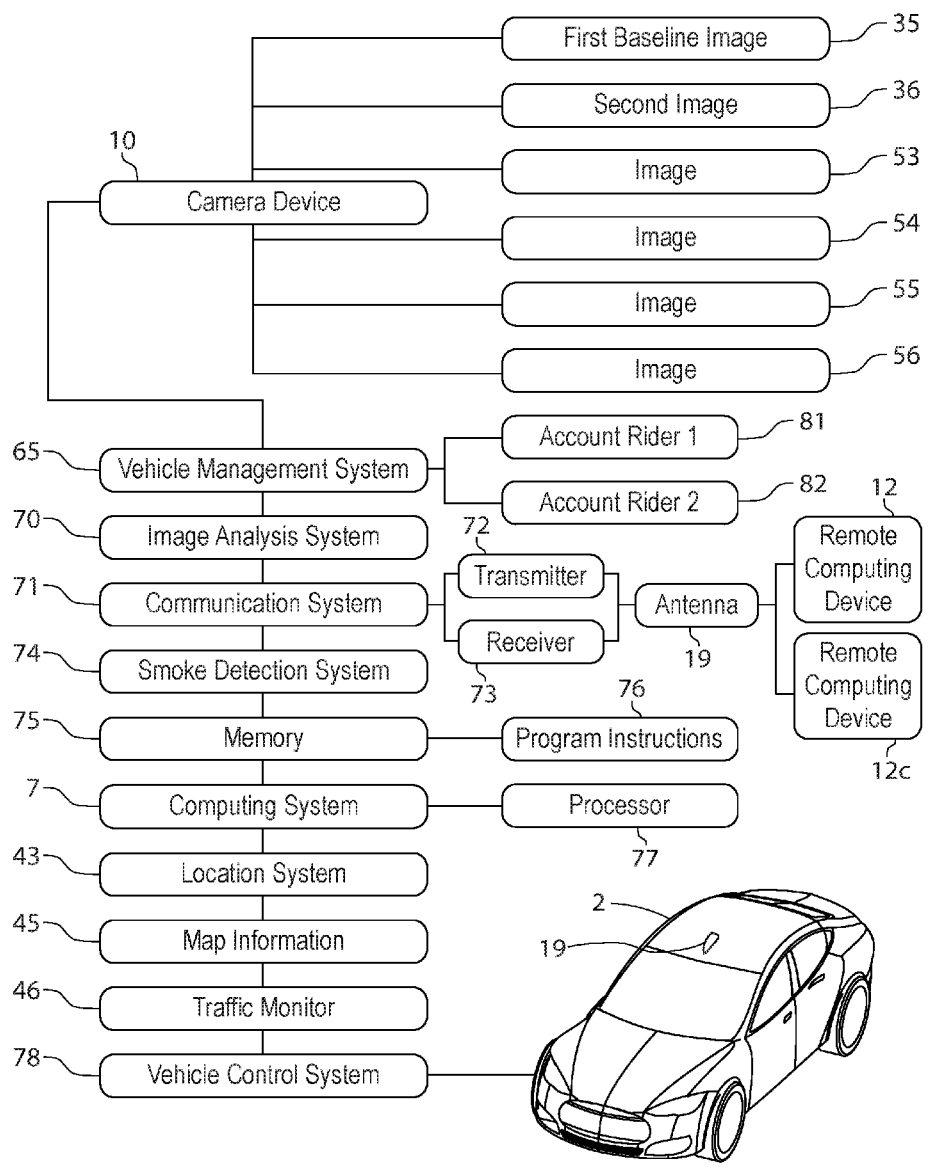
FIG. 9 illustrates a diagrammatic view that includes a self-driving vehicle and a camera system, according to some embodiments.

FIG. 9 illustrates some of the elements of the maintenance system. Each of the elements illustrated in FIG. 9 is optional and is not necessarily present in each embodiment.

The maintenance system can include a camera device 10, which can include memory 75 having many images 35, 36, 53, 54, 55, 56 taken by the camera device 10. The camera device 10 can be communicatively coupled to a vehicle management system 65.

The vehicle management system 65 can be communicatively coupled to an image analysis system 70, a communication system 71, a smoke detection system 74, a memory 75 having program instructions 76, computing systems 7 having processors 77, a location system 43, map information 45 configured to help the vehicle 2 navigate to destinations, a traffic monitoring system 46 configured to receive up-to-date traffic information to enable the vehicle management system 65 to choose optimal routes to destinations, and a vehicle control system 78.

The vehicle control system 78 is configured to steer, brake, and accelerate the vehicle 2. The vehicle control system 78 is also configured to detect roads and obstacles on the roads.

The location system 43 is configured to receive a location of the remote computing device 12 associated with the first rider 1 and is configured to receive a location of the remote computing device 12b associated with the second rider 1b. The remote computing devices 12, 12b can send GPS, indoor location information, and/or other location information to the location system 43 to help the vehicle management system 65 determine where to pick up the rider 1, 1b and/or determine where to drop off an item left behind by a rider 1, 1b.

A user of a remote computing device can complete a number of steps to associate the remote computing device with herself. For example, Apple Inc. makes iPhones, Apple Watches, iPads, laptop computers, and other remote computing devices. A user can associate the iPhone, Apple Watch, iPad, laptop computer, or other remote computing device made by Apple Inc. by (1) turning on the device, (2) using the "Quick Start" option if the user has another device running iOS or selecting the "Set Up Manually" option, (3) activating the device and choosing a Wi-Fi network, (4) setting up "Face ID" and creating a password, and (5) signing in with an "Apple ID." Of course, other remote computing devices use other methods to associate a remote computing device with a particular user.

In some cases, a remote computing device is associated with a user simply because the remote computing device is in the user's possession.

The communication system 71 can include a transmitter 72, a receiver 73, and an antenna 19. The antenna 19 can communicatively couple the vehicle management system 65 to remote computing devices 12, 12b of riders 1, 1b. The antenna 19 can communicatively couple the vehicle management system 65 to remote computing devices 12c of a manager of the vehicle 2.

The vehicle management system 65 can be communicatively coupled to an account 81 of a rider 1 to enable the system to fine the rider 1 for leaving items 39, 40 in the vehicle 2. The fine can be a dollar amount (e.g., $20) such as a trash 40 removal fee or a fee to return a valuable item 39 to a rider 1.

Some embodiments comprise a maintenance system configured to be used with a self-driving vehicle 2. In some embodiments, maintenance systems comprise a camera system coupled to an interior of the vehicle 2. The camera system can be configured to take a picture of an item left behind by a first rider. Maintenance system can comprise a vehicle management system configured to autonomously drive the vehicle 2 to a first location 8 to remove the item.

As used herein, a self-driving vehicle 2 can "autonomously drive" if the vehicle 2 is steering itself even if a person is providing input regarding navigation of the vehicle 2.

As used herein, a still image and a video can both types of pictures. As used herein, a still image and a video can both be types of images.

In some embodiments, the camera system comprises a first camera coupled to a ceiling of the vehicle 2 and directed towards a first row of the vehicle 2, and the camera system comprises a second camera coupled to the ceiling of the vehicle 2 and directed towards a second row of the vehicle 2. (The first camera can be directed towards a first row if an image taken by the camera shows the first row. The second camera can be directed towards a second row if an image taken by the camera shows the second row.)

In some embodiments, the camera system comprises a first camera coupled to a rear-view mirror of the vehicle 2 and directed towards a first row of the vehicle 2, and the camera system comprises a second camera coupled to a ceiling of the vehicle 2 and directed towards a second row of the vehicle 2.

In some embodiments, the camera system comprises a first camera located in a trunk area of the vehicle 2 such that the first camera is configured to enable an image analysis system 70 to determine if the item is left in the trunk area.

In some embodiments, the maintenance system comprises an image analysis system 70 configured to detect the item left behind by comparing a first baseline image 35 taken by the camera system of the interior of the vehicle 2 to a second image 36 taken by the camera system after the first baseline image 35. Some embodiments comprise determining that the item is present in the second image 36 but not present in the first baseline image 35.

In some embodiments, the vehicle management system is configured to automatically drive the vehicle 2 to the first location 8 to remove the item in response to the image analysis system 70 detecting the item left by the first rider.

Some embodiments comprise a communication system 71 configured to send a first wireless communication to a remote computing device 12 associated with the first rider in response to the image analysis system 70 detecting the item left behind by the first rider. The first wireless communication can be configured to notify the first rider that the item was left behind.

The communication system 71 can be configured to send the first wireless communication to a remote computing device 12 directly (e.g., via radio communications) or indirectly (e.g., via intermediary communication systems 5).

In some embodiments, the communication system 71 is configured to send a second wireless communication comprising a third image 53 of the item to the remote computing device 12 in response to the image analysis system 70 detecting the item left behind by the first rider. The third image 53 can enable the rider to see the item on a display of her remote computing device 12.

In some embodiments, the vehicle management system is configured to receive an address of the first location 8 from the remote computing device 12 in response to the communication system 71 sending the first wireless communication. The vehicle management system can be configured to receive the address from the remote computing device directly or indirectly.

As used herein, "address" is used broadly and is not limited to a street address. An address can be a Global Positioning System ("GPS") location and can be any other location indicator. An address can be an indoor location (e.g., a location inside a large shopping center or apartment complex).

In some embodiments, the first location 8 is an address at which the first rider has requested to pick up the item. The address can be the rider's current address. The address can also be a location at which the rider is not currently located by at which the rider (or the rider's representative) plans to meet the vehicle 2 (or another vehicle 2 carrying the item) to retrieve the item.

In some embodiments, the communication system 71 is configured to receive a third wireless communication from the remote computing device 12 associated with the first rider in response to the communication system 71 sending the first wireless communication. The third wireless communication can comprise instructions for shipping the item. The instructions can comprise an address to which the system should ship the item. The instructions can comprise a manner in which the item should be shipped.

In some embodiments, the first location 8 is a shipping location (such as a FedEx, UPS, or USPS facility) configured to remove the item from the vehicle 2 and configured to ship the item according to the shipping instructions. The vehicle management system can be configured to enable removing the item from the vehicle 2 once the vehicle 2 is located at the shipping location. The vehicle 2 can unlock a door to enable removing the item. The vehicle 2 can send a smaller, short-range delivery robot to deliver the item to the shipping location.

In some embodiments, the vehicle management system is configured to receive the first location 8 of a service area configured to clean the vehicle 2. The vehicle management system can be configured to drive the vehicle 2 to the service area to remove the item in response to the image analysis system 70 detecting the item left by the first rider.

Some embodiments comprise a third image 54 taken by the camera system in response to the vehicle 2 leaving the service area. Some embodiments comprise a communication system 71 configured to send a first wireless communication comprising the third image 54 to a remote computing device 12c associated with a manager of the vehicle 2. The first wireless communication can be configured to enable the manager to verify that the item was removed from the vehicle 2.

Some embodiments comprise a third image 56 taken by the camera system. The image analysis system 70 can be configured to compare the third image 56 to the second image 36 to detect that the item was removed from the vehicle 2.

In some embodiments, the vehicle management system is configured to fine an account of the first rider in response to the image analysis system 70 detecting the item left behind by the first rider. The fine can be a sum imposed as a punishment for leaving the item.

In some embodiments, a communication system 71 is configured to send a first wireless communication to a remote computing device 12 associated with the first rider in response to the image analysis system 70 detecting the item left behind by the first rider. The communication system 71 can be configured to send the first wireless communication to a remote computing device 12 directly (e.g., via radio communications) or indirectly (e.g., via intermediary communication systems 5).

The first wireless communication can comprise a third image 53 taken by the camera system. The third image 53 can be configured to show the item. The first wireless communication can be configured to ask the first rider if the item belongs to the first rider. The communication system 71 can be configured to receive a second wireless communication from the remote computing device 12 in response to the first wireless communication. The second wireless communication can be configured to inform the maintenance system that the first rider is an owner of the item. The maintenance system can comprise a memory configured to record that the first rider is the owner of the item.

In some embodiments, the system is configured to automatically drive the vehicle 2 to the rider's current location (e.g., a GPS location).

In some embodiments, the maintenance system comprises a location detection system 43 configured to receive the first location 8 of a remote computing device 12 associated with the first rider to enable the vehicle management system to autonomously drive the vehicle 2 to the first location 8 in response to an image analysis system 70 detecting the item left by the first rider. The image analysis system 70 can be a part of the camera system. The image analysis system 70 can be located remotely from the vehicle 2.

Some embodiments notify a manager of the vehicle 2 that an item was left behind.

In some embodiments, the maintenance system comprises an image analysis system 70 configured to detect the item left behind by comparing a first baseline image 35 taken by the camera system of the interior of the vehicle 2 to a second image 36 (of the interior) taken by the camera system after the first baseline image 35.

In some embodiments, the maintenance system comprises a communication system 71 having an antenna 19, a transmitter 72, and a receiver 73. The communication system 71 can be configured to send a first wireless communication to a remote computing device 12c associated with a manager of the vehicle 2 in response to the image analysis system 70 detecting the item left behind by the first rider.

As used herein, the "manager" a person (other than the rider who is just renting the vehicle 2) or entity who is responsible for the vehicle 2. The manager can be an owner of the vehicle 2. The manager can be a person or entity to whom the owner has entrusted management of the vehicle 2 and/or maintenance of the vehicle 2.

The communication system 71 can be configured to send the first wireless communication to a remote computing device 12 directly (e.g., via radio communications) or indirectly (e.g., via intermediary communication systems 5).

In some embodiments, the first wireless communication is configured to notify the manager that the item was left behind. The communication system 71 can be configured to send a second wireless communication comprising a third image of the item to the remote computing device 12c in response to the image analysis system 70 detecting the item left behind by the first rider.

In some embodiments, the vehicle management system is configured to receive a third wireless communication from the remote computing device in response to the communication system 71 sending the first wireless communication. The third second wireless communication can be configured to instruct the vehicle management system to autonomously drive the vehicle 2 to the first location 8 to remove the item.

In some embodiments, the vehicle management system is configured to determine that the first rider has exited the vehicle 2. The vehicle management system can be configured to cause the camera system to take a first interior image of the interior of the vehicle 2 in response to determining that the first rider has exited the vehicle 2.

In some embodiments, the maintenance system further comprises an image analysis system 70 having at least one processor 77 and a memory 75 comprising program instructions (e.g., code modules configured to be executed by one or more computers) that when executed by the at least one processor are configured to cause the image analysis system 70 to detect the item left behind by analyzing the first interior image taken by the camera system after the first rider has exited the vehicle 2. The first location 8 can be a vehicle cleaning facility. The vehicle management system can be configured to drive the vehicle 2 to the vehicle cleaning facility to remove the item in response to the image analysis system 70 detecting the item.

In some embodiments, the vehicle management system comprises a first mode and a second mode. In the first mode, the vehicle management system can be configured to make the vehicle 2 available to accept a pick-up request of a second rider. In the second mode, the vehicle management system can be configured to make the vehicle 2 unavailable to accept the pick-up request at that time (although the vehicle management system 65 can record the pick-up request such that the vehicle 2 can pick-up the person at a future time, such as after the vehicle 2 has been cleaned). As used herein, "available to accept a pick-up request" means that the vehicle 2 is ready to go pick up the person. As used herein, "unavailable to accept the pick-up request" means that the vehicle 2 is not ready to go pick up the person, but the pick-up can still be scheduled for a future time (e.g., after the vehicle 2 has been cleaned at a cleaning facility).

The vehicle management system can be configured to be in the second mode from a first time at which the image analysis system 70 detects the item left behind. The vehicle management system can be configured to exit the second mode and enter the first mode in response to at least one of the item being removed, receiving an indication that the vehicle 2 has been cleaned, and the vehicle 2 leaving a vehicle cleaning station. In some embodiments, the indication that the vehicle 2 has been cleaned comprises a wireless communication (e.g., from the cleaning facility) that communicates that the vehicle 2 has been cleaned.

In some embodiments, the vehicle management system is configured to determine that the first rider has exited the vehicle 2 in response to (1) receiving a location of a remote computing device 12 associated with the first rider and determining that the location is not inside the vehicle 2, (2) failing to detect a direct wireless communication from the remote computing device 12 to an antenna of the vehicle 2, (3) determining, by the image analysis system 70, that a second interior image does not show the first rider, and/or (4) determining, by the image analysis system 70, that an infrared image of the interior of the vehicle 2 does not show the first rider.

As used herein, a "direct wireless communication" is a wireless communication that does not use intermediary communication systems 5 for communicative coupling between the remote computing device 12 and an antenna 19 that is mechanically coupled to the vehicle 2. For example, the vehicle 2 can communicate directly with a remote computing device 12 located inside the vehicle 2 via Bluetooth. This Bluetooth communication is one example of a direct wireless communication. Other communication protocols other can Bluetooth can also enable direct wireless communication. Other radio communication systems can enable direct wireless communication.

In some embodiments, the maintenance system comprises at least one processor 77 and a memory 75 comprising program instructions that when executed by the at least one processor cause the maintenance system to (1) compare a first baseline image 35 taken by the camera system of the interior of the vehicle 2 to a second image 36 taken by the camera system after the first baseline image 35 to detect the item left behind by the first rider, and/or (2) drive, by the vehicle management system, the vehicle 2 to the first location 8 to remove the item in response to the detecting the item. The program instructions can comprise code modules configured to be executed by one or more computers located in the vehicle 2 and/or located away from the vehicle 2.

In some embodiments, the first location 8 is a first vehicle cleaning facility. The program instructions can be configured to select the first vehicle cleaning facility based at least in part on determining a distance from the vehicle 2 to the first vehicle cleaning facility and/or based at least in part on determining that the first vehicle cleaning facility is approved by a manager of the vehicle 2.

A manager can receive a list of vehicle cleaning facilities. The list can include prices, services offered, user reviews, and locations. The manager can then select which of the vehicle cleaning facilities she approves. Once approved, the system can select which of the approved facilities to use to clean the vehicle 2 based on many factors including which facility is open, which facility is closest to the current location of the vehicle 2, and which facility will be closest to an anticipated future location of the vehicle 2.

The memory 75 can comprise a list vehicle cleaning facilities that were approved by the manager of the vehicle 2. The program instructions can be configured to choose a cleaning facility that was previously approved by the manager and is located near the current location of the vehicle 2.

In some embodiments, the program instructions are configured to send a first wireless communication to a remote computing device 12 associated with the first rider in response to detecting the item. The first wireless communication can comprise an image of the item. The program instructions can be configured to receive a second wireless communication from the remote computing device 12 in response to sending the first wireless communication. The second wireless communication can comprise an instruction (e.g., from the first rider) to return the item. The program instructions can be configured to drive, by the vehicle management system, the vehicle 2 to the first location 8 in response to the instruction.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle 2 can be any suitable vehicle. For example, the self-driving vehicle 2 can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle 2 can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real world driving data. In some embodiments, self-driving vehicles sometimes drive themselves, sometimes are driven remotely by a computing system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive (e.g., steer and control speed) itself (e.g., in response to a destination requested by the human).

The remote computing device 12 can be a smartphone, a tablet computer, a laptop computer, a desktop computer, a server, augmented reality glasses, an implanted computer, and/or any type of computer. A rider can bring her remote computing device 12 into the self-driving vehicle 2 and then can leave the self-driving vehicle 2 with her remote computing device 12. In some embodiments, the rider requests a ride at her home with a remote computing device 12, but then leaves the remote computing device 12 at home when she goes to get a ride from the vehicle 2.

In some embodiments, the remote computing device 12 is an iPhone made by Apple Inc. or an Android phone based on software made by Alphabet Inc. The remote computing device 12 can comprise a speaker configured to emit sounds, a microphone configured to record sounds, and a display screen configured to display images. The remote computing device 12 can comprise a battery configured to provide electrical power to operate the remote computing device 12.

In some embodiments, portions of the vehicle management system 65 can be physically coupled to the self-driving vehicle 2 while other others of the vehicle management system 65 are not physically coupled to the vehicle 2 and are located remotely relative to the vehicle 2.

In some embodiments, at least a portion of the vehicle management system 65 is located in the vehicle 2. In several embodiments, at least a portion of the vehicle management system 65 is located remotely relative to the vehicle 2. The vehicle management system 65 can comprise many servers, computers, and vehicles. The vehicle management system 65 can comprise cloud computing and cloud storage.

In several embodiments, the entire vehicle management system 65 is located in the self-driving vehicle 2. The vehicle 2 can comprise the vehicle management system 65. In some embodiments, a first portion of the vehicle management system 65 is physically coupled to the vehicle 2, and a second portion of the vehicle management system 65 is not physically coupled to the vehicle 2. The second portion can be located remotely relative to the vehicle 2. In several embodiments, the entire vehicle management system 65 is located remotely relative to the vehicle 2.

The phrase "communicatively coupling" can include any type of direct and/or indirect coupling between the self-driving vehicle 2, remote computing device 12, and vehicle management system 65. For example, the remote computing device 12 can be communicatively coupled to the vehicle management system 65 via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can also stored on the remote computing device, although data can be stored remotely and accessed by the native app. Depending on the nature of the native app, Internet connectivity may not be required.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A maintenance system configured to be used with a self-driving vehicle, the maintenance system comprising:
   a camera system coupled to an interior of the vehicle, wherein the camera system is configured to take a picture of an item left behind by a rider; and
   a vehicle management system configured to autonomously drive the vehicle to a first location to remove the item, wherein the vehicle management system is configured to determine that the rider has exited the vehicle by receiving a second location of a remote computing device of the rider and determining that the second location is not inside the vehicle.

2. The maintenance system of claim 1, wherein the camera system comprises a camera coupled to at least one of a ceiling of the vehicle and a rear-view mirror of the vehicle, wherein the camera is directed towards a first row of the vehicle.

3. The maintenance system of claim 1, wherein the camera system comprises a camera located in a trunk area of the vehicle such that the camera is configured to enable an image analysis system to determine if the item is left in the trunk area.

4. The maintenance system of claim 1, further comprising an image analysis system configured to detect the item left behind by comparing a first baseline image taken by the camera system of the interior of the vehicle to a second image taken by the camera system after the first baseline image.

5. The maintenance system of claim 4, wherein the vehicle management system is configured to receive the first location of a service area configured to clean the vehicle, and the vehicle management system is configured to drive the vehicle to the service area to remove the item in response to the image analysis system detecting the item left by the rider.

6. The maintenance system of claim 5, further comprising a third image taken by the camera system in response to the vehicle leaving the service area; and
   a communication system configured to send a first wireless communication comprising the third image to a remote computing device associated with a manager of the vehicle, wherein the first wireless communication is configured to enable the manager to verify that the item was removed from the vehicle.

7. The maintenance system of claim 4, further comprising a third image taken by the camera system, wherein the image analysis system is configured to compare the third image to the second image to detect that the item was removed from the vehicle.

8. The maintenance system of claim 4, wherein the vehicle management system is configured to fine an account of the rider in response to the image analysis system detecting the item left behind by the rider.

9. The maintenance system of claim 4, further comprising a communication system configured to send a first wireless communication to a remote computing device of the rider in response to the image analysis system detecting the item left behind by the rider, wherein the first wireless communication comprises a third image taken by the camera system, the third image is configured to show the item, the first wireless communication is configured to ask the rider if the item belongs to the rider, the communication system is configured to receive a second wireless communication from the remote computing device in response to the first wireless communication, and the second wireless communication is configured to inform the maintenance system that the rider is an owner of the item.

10. A maintenance system configured to be used with a self-driving vehicle, the maintenance system comprising:
   a camera system coupled to an interior of the vehicle, wherein the camera system is configured to take a picture of an item left behind by a rider; and
   a vehicle management system configured to autonomously drive the vehicle to a first location to remove the item, wherein the vehicle management system is configured to determine that the rider has exited the vehicle by failing to detect a direct wireless communication from a remote computing device to an antenna of the vehicle.

11. The maintenance system of claim 10, further comprising a communication system configured to send a first wireless communication to the remote computing device of the rider in response to an image analysis system detecting the item left behind by the rider, wherein the first wireless communication is configured to notify the rider that the item was left behind.

12. The maintenance system of claim 11, wherein the communication system is configured to send a second wireless communication comprising an image of the item to the remote computing device of the rider in response to the image analysis system detecting the item left behind by the rider.

13. The maintenance system of claim 11, wherein the communication system is configured to receive a third wireless communication from the remote computing device of the rider in response to the communication system sending the first wireless communication, wherein the third wireless communication comprises instructions for shipping the item.

14. The maintenance system of claim 10, further comprising an image analysis system configured to detect the item left behind by comparing a first baseline image taken by the camera system of the interior of the vehicle to a second image taken by the camera system after the first baseline image; and
   a communication system having an antenna and a transmitter, wherein the communication system is configured to send a first wireless communication to a remote computing device associated with a manager of the vehicle in response to the image analysis system detecting the item left behind by the rider.

15. The maintenance system of claim 14, wherein the first wireless communication is configured to notify the manager that the item was left behind, the communication system is configured to send a second wireless communication comprising a third image of the item to the remote computing device in response to the image analysis system detecting the item left behind by the rider, wherein the vehicle management system is configured to receive a third wireless communication from the remote computing device in response to the communication system sending the first wireless communication, wherein the third wireless communication is configured to instruct the vehicle management system to autonomously drive the vehicle to the first location to remove the item.

16. The maintenance system of claim 10, wherein the vehicle management system is configured to determine that the rider has exited the vehicle and is configured to cause the camera system to take a first interior image of the vehicle in response to determining that the rider has exited the vehicle,
   wherein the maintenance system further comprises an image analysis system having at least one processor and a memory comprising program instructions that when executed by the at least one processor are configured to cause the image analysis system to detect the item left behind by analyzing the first interior image taken by the camera system after the rider has exited the vehicle,
   wherein the first location is a vehicle cleaning facility, and the vehicle management system is configured to drive the vehicle to the vehicle cleaning facility to remove the item in response to the image analysis system detecting the item.

17. The maintenance system of claim 10, further comprising:
   at least one processor; and
   a memory comprising program instructions that when executed by the at least one processor cause the maintenance system to:
      compare a first baseline image taken by the camera system of the interior of the vehicle to a second image taken by the camera system after the first baseline image to detect the item left behind by the rider, and
      drive, by the vehicle management system, the vehicle to the first location to remove the item in response to the detecting the item.

18. The maintenance system of claim 17, wherein the first location is a vehicle cleaning facility, and the program instructions are configured to select the vehicle cleaning facility based at least in part on determining a distance from the vehicle to the vehicle cleaning facility and based at least in part on determining that the vehicle cleaning facility is approved by a manager of the vehicle.

19. The maintenance system of claim 17, wherein the program instructions are configured to send a first wireless communication to a remote computing device of the rider in response to detecting the item, wherein the first wireless communication comprises an image of the item, and the program instructions are configured to receive a second wireless communication from the remote computing device in response to sending the first wireless communication, wherein the second wireless communication comprises an instruction to return the item, and the program instructions are configured to drive, by the vehicle management system, the vehicle to the first location in response to the instruction.

20. The maintenance system of claim 10, further comprising a location detection system configured to receive the first location of a remote computing device of the rider to enable the vehicle management system to autonomously drive the vehicle to the first location in response to an image analysis system detecting the item left by the rider.

21. A maintenance system configured to be used with a self-driving vehicle, the maintenance system comprising:
- a camera system coupled to an interior of the vehicle, wherein the camera system is configured to take a picture of an item left behind by a rider;
- a vehicle management system configured to autonomously drive the vehicle; and
- a location detection system configured to receive location information indicative of a current location of a remote computing device of the rider after the rider has exited the vehicle, wherein the vehicle management system is adapted to autonomously drive the vehicle to the current location of the remote computing device to return the item to the rider.

22. The maintenance system of claim 21, wherein the vehicle management system is configured to automatically drive the vehicle to the current location to remove the item in response to an image analysis system detecting the item left by the rider.

23. The maintenance system of claim 21, wherein the location information indicative of the current location comprises Global Positioning System data from the remote computing device.

24. The maintenance system of claim 21, wherein the vehicle management system is adapted to autonomously drive the vehicle to the current location of the remote computing device to return the item to the rider in response to an image analysis system detecting the item left by the rider.

25. The maintenance system of claim 21, wherein the location detection system is configured to track the current location of the remote computing device of the rider to enable the vehicle management system to autonomously drive the vehicle to the current location of the remote computing device to return the item to the rider.

26. The maintenance system of claim 25, further comprising a communication system configured to send a wireless communication to the remote computing device of the rider, wherein the wireless communication is configured to notify the rider that the item was left behind.

27. The maintenance system of claim 21, further comprising an image analysis system configured to detect the item left by the rider, wherein the location detection system is configured to begin tracking the current location of the remote computing device in response to the image analysis system detecting the item left by the rider.

28. The maintenance system of claim 27, further comprising a communication system configured to send a wireless communication to the remote computing device of the rider, wherein the wireless communication is configured to ask the rider if the item belongs to the rider.

29. The maintenance system of claim 21, wherein the location detection system is configured to begin tracking the current location of the remote computing device in response to the location detection system determining that the remote computing device has exited the vehicle.

* * * * *